Dec. 4, 1951 — P. N. E. NAIDU ET AL — 2,577,353

PROCESS FOR PRODUCING FIBRIN FROM WHOLE BLOOD

Filed July 7, 1948

INVENTORS.
Pagadam N. E. Naidu and
Laurence W. Murphy
BY
Donald H. Swett Atty.

Patented Dec. 4, 1951

2,577,353

UNITED STATES PATENT OFFICE 2,577,353

PROCESS FOR PRODUCING FIBRIN FROM WHOLE BLOOD

Pagadam N. E. Naidu, Waukegan, Ill., and Laurence W. Murphy, Austin, Minn.; said Naidu assignor to Abbott Laboratories, North Chicago, Ill., a corporation of Illinois, and said Murphy assignor to Geo. A. Hormel & Company, Austin, Minn., a corporation of Delaware Application July 7, 1948, Serial No. 37,454

6 Claims. (Cl. 260—112)

Our invention relates to the processing of whole blood to recover fibrin therefrom, and includes among its objects and advantages a product of high purity and quality and an efficient method of securing the fibrin without the use of anticoagulants.

According to the invention no anticoagulant is used, but the clots and incipient clots are successively disintegrated by cutting and attrition and centrifugal force down to a size such that the fibrin can be separated from the other ingredients.

Figures 1, 2:
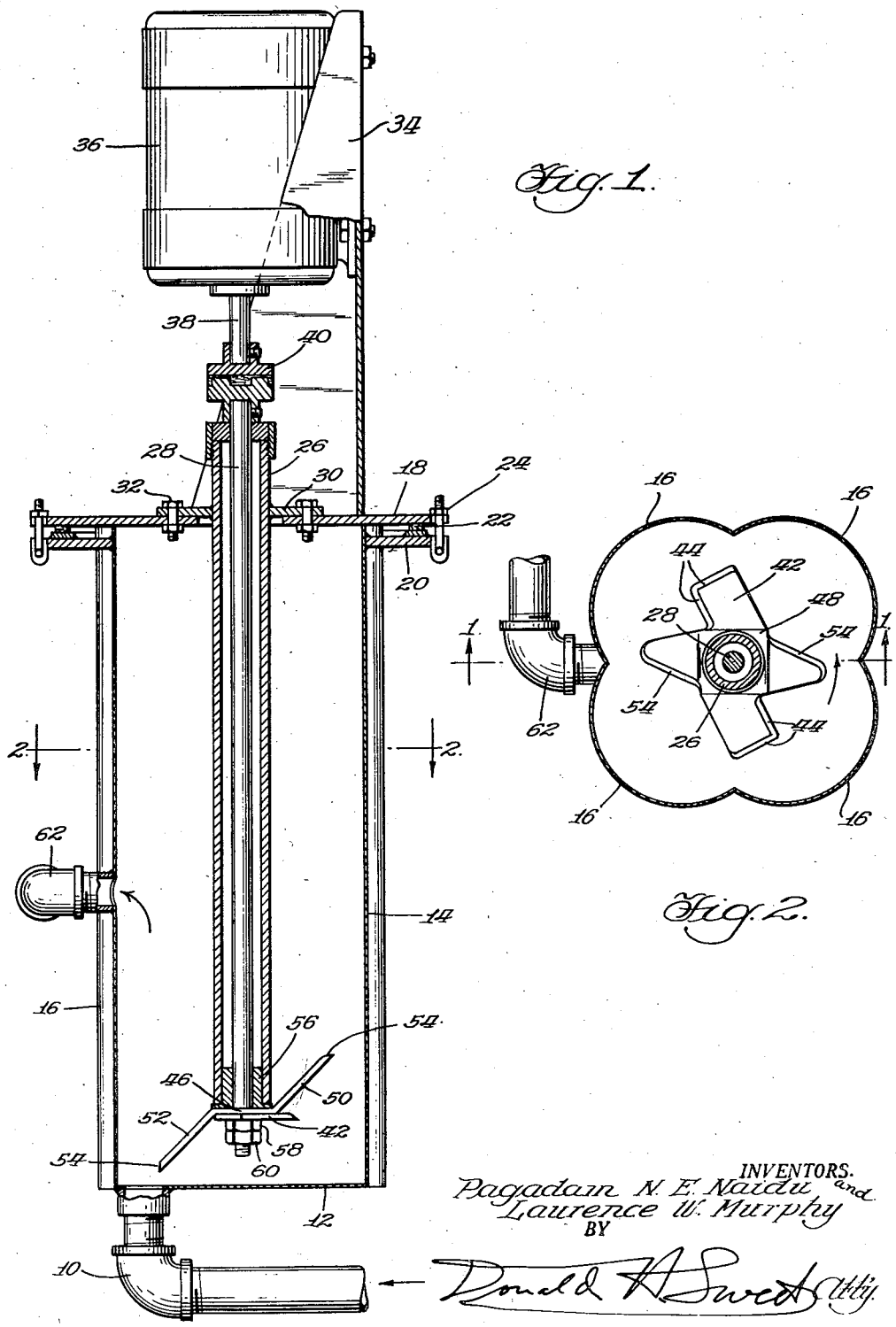
Figure 1 is a vertical section substantially as on line 1—1 of Figure 2 of a clot reducer used in one stage of the process.
Figure 2 is a horizontal section substantially as on line 2—2 of Figure 1.

One satisfactory reducer we have used is according to the drawings, and the container is 32 inches high. The blood from the floor of the slaughter house is delivered through the 2" pipe 10. Good results are secured by using a centrifugal pump which will break up any clots or incipient clots sufficiently so that the material moves readily through a pipe of the size indicated, up into the container. In practice the pieces thus formed are usually from ¼" to 1" in size. The container comprises the bottom wall 12, the side wall 14 formed in the shape of four lobes 16, and the cover 18. Suitable means are provided for mounting the cover removably in place on the container. We have illustrated a flange 20 welded to the wall 14 which is below the top and a rubber sealing gasket 22. The cover 18 is merely placed on the sealing gasket and bolted down by suitable bolts 24.

The cover 18 is centrally apertured to receive the housing 26 for the drive shaft 28, and the housing 26 carries a collar 30 bolted onto the cover by bolts 32. On the same cover we mount the standard 34 for supporting the motor 36. The motor 36 drives the shaft 38, which is connected to the shaft 28 by a conventional coupling 40.

The beater proper comprises the flat blade 42 having the configuration best illustrated in Figure 2 with its leading edges at 44 bevelled to sharp cutting edges; and the offset blade 46 which has a horizontal hub portion 48 and an upwardly sloping arm 50 and a downwardly sloping arm 52. Except for the slope, the arms 50 and 52 are duplicates and have their leading edges bevelled to a cutting edge at 54. The shaft 28 is guided in the bushing 56 at its lower end, which is above the beater blades, and the blades are held in place by the holding nut 58 and the lock nut 60. A little less than half way to the top of the chamber we provide 1½" outlet pipe 62.

A speed of 1800 R. P. M. for the beater blades produces good results, and with the blades rotating at that speed, blood can be passed through up to about 2650 pounds per hour and come from the reducer properly conditioned. In such blood, the individual clots have their major dimensions up to a maximum size of about 2.7 to 3.5 millimeters.

One complete procedure for treating blood according to the invention is as follows: substantially pure, clean blood may be taken from the slaughter room during slaughtering as fast as it accumulates, or allowed to stand overnight without interfering with the results, except that it should be refrigerated to postpone decomposition. In either instance, by the time the centrifugal pump has delivered it to the reducer it will have had time to undergo an initial clotting action.

In the reducer the clots are cut or sliced by the blades and reduced to a maximum size of 2.7 to 3.5 mm. As the blood comes from the reducer it is delivered to separating means in the nature of a centrifugal decanter. One well known type of such machine has a rotating conical shell to receive the material, with the wall of the shell at an angle about 8° to the axis of rotation. Within the shell is a helical scroll or conveyor blade, the edges of which have a clearance of only a few thousandths of an inch from the wall of the shell. An effective clearance is about 30 thousandths of an inch. The scroll rotates with the shell but with a speed differing from that of the shell by an amount of the order of magnitude of 10 R. P. M., whereas the shell may turn at 3250 R. P. M. and generate centrifugal forces about 2500 times gravity. Thus soft clot particles larger than 30 thousandths of an inch are pinched and broken at the crack between the scroll and the shell. Clot particles small enough to let themselves edge under the scroll, due to the centrifugal and axial force, get rolled and massaged repeatedly and tend to disintegrate before they get out from under. But the fibrin free of included liquid builds up into particles large enough and solid enough to hold themselves away from getting pinched at the crack. These have sufficient mechanical resistance to deformation of shape to roll along up the scroll and find their way out at the small end. The action of the parallel opposed confining surfaces of the scroll edge and the shell appears to be highly effective on soft clot particles, but the relatively rigid fibrin grains escape the crack and climb out. This selective action all along the crack appears to be highly effective in continuing the repeated pinching and rolling of particles that remain soft, while rejecting the harder, finished particles of fibrin.

In this way accumulated solids are picked up by the edge of the scroll and moved along the wall of the shell toward the small end, while liquid material works past the edge of the scroll toward the large end. Thus the combined centrifugal action on all the material plus the mechanical attrition between the edge of the scroll and the wall of the shell completes the entire rupture of the clots and separates the fibrin, which can be delivered at the small end of the cone as a wet solid, while the large end delivers the liquid phase containing practically all the plasma and red corpuscles.

As centrifugal decanters of the type referred to are known and, per se, form no part of the present invention, this disclosure has not been encumbered with the details of construction thereof.

The wet fibrin thus obtained is granular. It contains about 80% moisture and is reddish in color, due to the presence of a small amount of hemoglobin. It may be washed with water, and the water removed to the extent desired to wash out minor traces of hemoglobin. The water removal may be done in an ordinary perforated basket centrifuge or in a second centrifugal decanter. The washed material is granular and white and can be dried in any conventional way and is then ready for use as a finished product.

In many slaughtering practices, the blood obtainable is not substantially pure and clear, but materially contaminated with other substances, such as animal hair, spittle, unswallowed food, and straw, sand and dirt picked up from the surfaces over which the blood has flowed. When the blood is thus contaminated it is pumped and reduced as previously pointed out. Then, before separating the fibrin, it is placed in a powerful centrifuge. The specific gravity of the clots at this time is low enough so that the undesirable solids can easily be separated out in this way, and the remainder is then delivered to the centrifugal decanter. The rest of the processing is identical with that already described.

We are aware that fibrin has in the past been separated from whole blood by subjecting the fresh blood to a violent whipping action immediately after the blood is drawn and before the blood has had time to clot. This procedure requires the handling of small amounts of blood in batches.

It is also known to add anticoagulant to the blood so that it can be processed later in large batches. However, this procedure requires a centrifugal treatment to separate red blood corpuscles only, and the remaining plasma has to be chemically treated to precipitate the fibrin and then centrifuged to separate the precipitate. And after such separation still another purification is necessary to get rid of the chemicals used to prevent coagulation and the chemicals used to effect precipitation.

Whole blood contains from .3% to .4% of fibrin, about 60% serum and about 40% hemoglobin. The procedure herein disclosed accomplishes initial separation of the fibrin from both serum and hemoglobin and the fibrin obtained contains only a minor fraction of hemoglobin.

Fibrin produced by chemical precipitation, as above outlined, is in the form of large masses of meaty, stringy material. For purification purposes it has to be further processed by grinding, washing, centrifuging, drying and then grinding the dry product. Processing of this sort can eventually reduce it to a flour-like powder, which powder wets down to a smooth paste.

The product according to the invention herein disclosed is granular even when wet, and the lumps are usually from about $\frac{1}{16}$" to $\frac{1}{8}$" in dimension.

Others may readily adapt the invention for use under various conditions of service by employing one or more of the novel features involved, or equivalents thereof. As at present advised with respect to the apparent scope of our invention, we desire to claim the following subject matter.

1. The process of producing granular fibrin from naturally clotted blood which comprises finely dividing clotted whole blood, and by attrition rupturing said clots to release and agglomerate the fibrin into granular particles.

2. The process of producing granular fibrin of high purity which comprises allowing whole blood to undergo an initial natural clotting action, disintegrating the resulting clots by cutting and slicing the clots while dispersed in the liquid medium of the blood and while subjecting the same to a beating action, releasing the fibrin from the resulting cut and sliced clots by subjecting the clots while dispersed in the liquid medium to attrition sufficient to rupture the clots and agglomerate the fibrin, separating the resulting granular fibrin from the unwanted plasma and blood cells, and washing the fibrin to remove any retained impurities.

3. The process of producing highly purified granular fibrin from whole blood which comprises allowing whole blood to clot naturally, finely dividing the resulting clots while dispersed in a liquid medium of the blood, rupturing said clots in said liquid medium by attrition to release the fibrin, separating the resulting granular fibrin, and washing the resulting fibrin to remove any retained impurities.

4. The process of producing highly purified granular fibrin from whole blood which comprises allowing whole blood to clot naturally, finely dividing the resulting clots while dispersed in the liquid medium of the blood by cutting and slicing the clots while subjecting them to a beating action, rupturing said clots while dispersed in a liquid medium by attrition sufficient to separate and agglomerate the fibrin, separating the resulting granular fibrin, and washing the fibrin to remove any retained impurities.

5. The process of producing substantially pure granular fibrin from naturally clotted blood which comprises: dividing the clots into fragments and subjecting said clot fragments to attrition sufficient to complete the entire rupture of all cellular structures in said clots; and separating substantially pure fibrin from the resultant mixture.

6. A process according to claim 5 in which the attrition is mechanically done by pinching and rolling the fragments in a crack about thirty-thousandths of an inch wide.

PAGADAM N. E. NAIDU.
LAURENCE W. MURPHY.

(References on following page)

REFERENCES CITED

The following references are of record in the file of this patent:

UNITED STATES PATENTS

| Number | Name | Date |
|---|---|---|
| 295,298 | Smith | Mar. 18, 1884 |
| 1,369,180 | Lindenberg | Feb. 22, 1921 |
| 1,563,491 | Hoyle | Dec. 1, 1925 |
| 1,614,337 | Atwood | Jan. 11, 1927 |
| 1,671,868 | McGougan | May 29, 1928 |
| 1,699,471 | Laughlin | Jan. 15, 1929 |
| 1,780,067 | Cox | Oct. 28, 1930 |
| 2,055,263 | Robinson | Sept. 22, 1936 |
| 2,109,501 | Osius | Mar. 1, 1938 |
| 2,165,722 | Norman | July 11, 1939 |
| 2,358,827 | Rakowsky | Sept. 26, 1944 |
| 2,371,681 | Durdin | Mar. 20, 1945 |
| 2,377,496 | Hopkins | June 5, 1945 |

FOREIGN PATENTS

| Number | Country | Date |
|---|---|---|
| 27,871 of 1902 | Great Britain | Nov. 12, 1903 |
| 13,698 of 1895 | Great Britain | Aug. 17, 1895 |

OTHER REFERENCES

"Centrifuge Steps up Grinding Efficiency," by W. B. Lenhart, in Rock Products, August 1943, pp. 84–86.

Ferry et al.: Ind. and Eng. Chem., (December 1946), vol. 38, pp. 1217–1221.

Grey: Surgery, Gynecol., and Obst., vol. XXI, pp. 452–454 (1915).

Harvey: Boston Medical and Surg. J., vol. CLXXIV, pp. 658–659, (May 4, 1916).